(12) United States Patent
An et al.

(10) Patent No.: US 9,378,705 B2
(45) Date of Patent: Jun. 28, 2016

(54) CONVERSION SYSTEM AND METHOD FOR CONVERTING RGB DATA TO RGBW DATA

(71) Applicant: Shenzhen China Star Optoelectronics Technology Co., Ltd., Shenzhen, Guangdong (CN)

(72) Inventors: Taisheng An, Guangdong (CN); Jiehui Qin, Guangdong (CN); Xiaoping Tan, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 14/420,376

(22) PCT Filed: Nov. 24, 2014

(86) PCT No.: PCT/CN2014/092079
§ 371 (c)(1),
(2) Date: Feb. 9, 2015

(87) PCT Pub. No.: WO2016/078100
PCT Pub. Date: May 26, 2016

(65) Prior Publication Data
US 2016/0140932 A1    May 19, 2016

(30) Foreign Application Priority Data
Nov. 19, 2014   (CN) .......................... 2014 1 0665559

(51) Int. Cl.
G09G 5/02      (2006.01)
G09G 5/06      (2006.01)
H04N 9/64      (2006.01)
H04N 1/60      (2006.01)
H04N 5/57      (2006.01)
H04N 9/73      (2006.01)

(52) U.S. Cl.
CPC ................. *G09G 5/02* (2013.01); *H04N 9/646* (2013.01); *G09G 2300/0452* (2013.01); *G09G 2340/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 2007/0279372 A1* | 12/2007 | Brown Elliott | ...... | G09G 3/3426 345/102 |
| 2009/0085926 A1* | 4/2009 | Kim | ..................... | G09G 3/2003 345/604 |
| 2009/0284540 A1* | 11/2009 | Higgins | ............... | G09G 3/3406 345/581 |
| 2010/0103187 A1* | 4/2010 | Linssen | ................ | G09G 3/2003 345/590 |
| 2011/0043553 A1* | 2/2011 | Brown Elliott | ...... | G09G 3/3406 345/694 |
| 2013/0222414 A1* | 8/2013 | Ito | ........................... | G09G 5/02 345/600 |

* cited by examiner

*Primary Examiner* — Wesner Sajous
(74) *Attorney, Agent, or Firm* — Andrew C. Cheng

(57) ABSTRACT

A conversion system for converting RGB data to RGBW data includes a four-color determination unit configured to determine outputted RGBW values according to inputted RGB values and a color saturation value calculated from the inputted RGB values; and an output unit configured to output the outputted RGBW values. A conversion method for converting RGB data to RGBW data is also disclosed. The conversion system and method for converting RGB data to RGBW data of the present invention can appropriately decrease the outputted W value and appropriately increase the outputted RGB values at the same time. Comparing to the conversion system of the display device of the conventional technology based on four-color subpixels, the brightness of the display device of the present invention can be maintained in the same degree, and increase the color saturation of the display device of the present invention.

2 Claims, 2 Drawing Sheets

CONVERSION SYSTEM AND METHOD FOR CONVERTING RGB DATA TO RGBW DATA

BACKGROUND OF THE INVENTION

1. Field of the Invention

The present invention relates to a display technology field, and more particularly to a conversion system and method for converting RGB data to RGBW data.

2. Description of Related Art

Currently, an LCD panel or an organic light emitting diode (OLED) display panel utilizes a red (R) subpixel unit, a green (G) subpixel unit, and a blue (B) subpixel unit to form one pixel unit. The LCD panel controls an R data of the red subpixel unit, a G data of the green subpixel unit, and a B data of the blue subpixel to mix a required color for displaying.

With the development of information technology, a variety of demands for the display panel is increased. High transmittance, low power consumption, and good image quality have become people's demand for the display panel. The light transmittance and mixing efficiency of the current RGB color mixing method is relative low such that the power consumption is large so as to limit the improvement of the display panel. Accordingly, a display panel having four subpixel units formed by a red (R) subpixel unit, a green (G) subpixel units, a blue (B) subpixel unit and a fourth subpixel unit (for example, a white (W) subpixel unit) is appear in order to improve the display quality of the display panel based on three subpixel units.

In the prior art, and in a display panel having four subpixel units, a minimum value of the RGB values is set as an output value of W (white) color. In this case, with the adding of the white subpixel unit, the brightness of the display panel having four subpixel units is greatly increased, and the power consumption is also reduced. However, because the increase of the brightness, the display panel having four subpixel units comparing with the display panel having three subpixel units is smaller in color gamut, and the color saturation is reduced.

SUMMARY OF THE INVENTION

In order to solve the above technology problem, an object of the present invention is to provide a conversion system for converting Red-Green-Blue (RGB) data to Red-Green-Blue-White (RGBW) data, comprising: a four-color determination unit configured to determine outputted RGBW values according to inputted RGB values and a color saturation value calculated from the inputted RGB values; and an output unit configured to output the outputted RGBW values.

Wherein, the four-color determination unit comprises: a comparison unit configured to determine a maximum value and a minimum value of the inputted RGB values; a color saturation calculation unit configured to calculate a color saturation value according to the inputted RGB values; and a four-color calculation unit configured to calculate the outputted RGBW values according to the maximum value of the inputted RGB values, the minimum value of the inputted RGB values, and the color saturation value.

Wherein, four-color calculation unit is further configured to use a Formula 2 to calculate the outputted RGBW values, $Ro=[(Max(Ri,Gi,Bi)+Wo)/Max(Ri,Gi,Bi)]\times Ri-Wo;$ $Go=[(Max(Ri,Gi,Bi)+Wo)/Max(Ri,Gi,Bi)]\times Gi-Wo;$ $Ro=[(Max(Ri,Gi,Bi)+Wo)/Max(Ri,Gi,Bi)]\times Bi-Wo;$ and $Wo=Min(Ri,Gi,Bi)\times(1-S);$ [Formula 2]

wherein, Ri represents the inputted R value, Gi represents the inputted G value, Bi represents the inputted B value, Ro represents the outputted R value, Go represents the outputted G value, Bo represents the outputted B value, Wo represents the outputted W value, S represents the color saturation value, Max(Ri,Gi,Bi) represents the maximum value of the inputted RGB values, Min(Ri,Gi,Bi) represents the minimum value of the inputted RGB values.

Wherein, when the minimum value of the inputted RGB values is increased and the color saturation value calculated from the inputted RGB values is decreased, the outputted W value is increased.

The conversion system and method for converting RGB data to RGBW data of the present invention can appropriately decrease the outputted W value and appropriately increase the outputted RGB values at the same time. Comparing to the conversion system of the display device of the conventional technology based on four-color subpixels, the brightness of the display device of the present invention can be maintained in the same degree, and increase the color saturation of the display device of the present invention.

BRIEF DESCRIPTION OF THE DRAWINGS

In order to more clearly illustrate the technical solution in the present invention or in the prior art, the following will illustrate the figures used for describing the embodiments or the prior art. It is obvious that the following figures are only some embodiments of the present invention. For the skilled persons of ordinary skill in the art without creative effort, it can also obtain other figures according to these figures.

DETAILED DESCRIPTION OF THE PREFERRED EMBODIMENT

The following content combines with the drawings and the embodiment for describing the present invention in detail.

The display device of the present embodiment uses a liquid crystal display (LCD) device as an example, but the present invention is not limited to the LCD device. For example, the display device of the present embodiment may also be an organic light emitting diode (OLED) display device or the like.

Figure 1:
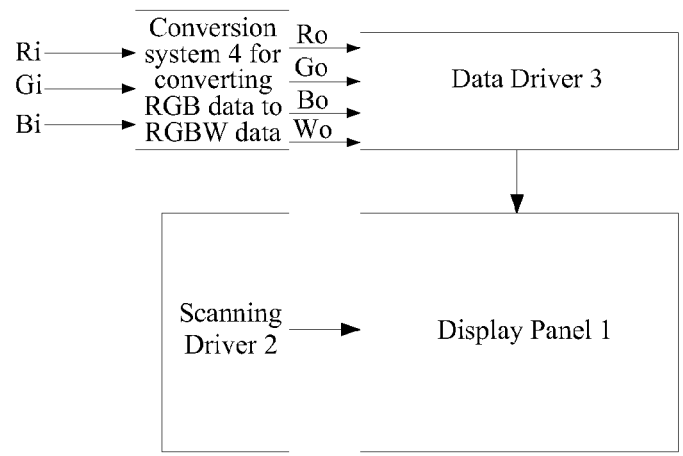
FIG. 1 is a block diagram of a display device according to an embodiment of the present invention.
Figure 2:
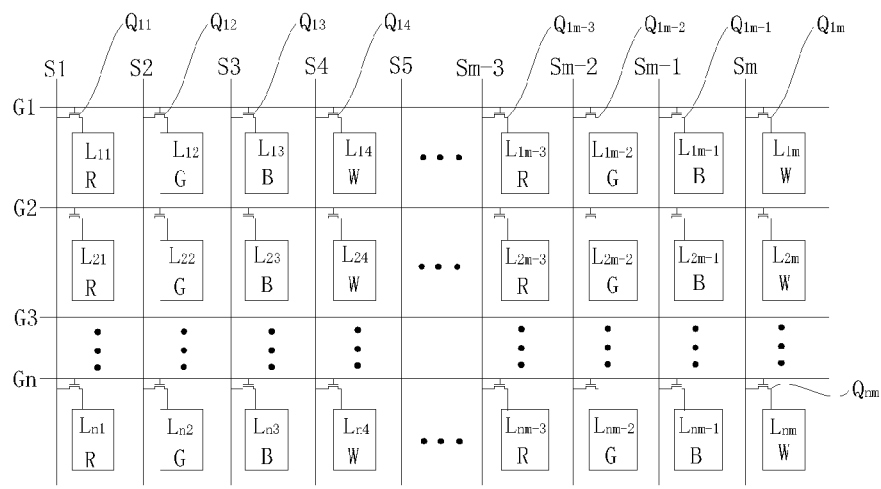
FIG. 2 is a schematic structure diagram of the display panel according to an embodiment of the present invention.

FIG. 1 is a block diagram of a display device according to an embodiment of the present invention; FIG. 2 is a schematic structure diagram of the display panel according to an embodiment of the present invention.

With reference to FIG. 1 and FIG. 2, the display device according to an embodiment of the present invention includes: a display panel 1, a scanning driver 2, a data driver 3, and a conversion system 4 for converting RGB data (i.e. RGB values) to RGBW data (i.e. RGBW values).

The display panel 1 includes: multiple scanning lines G1 to Gn (wherein, n is a natural number) extended along a row direction, multiple data lines S1 to Sm (wherein, m is a natural number) extended along a column direction. The scanning lines G1 to Gn are all connected to the scanning driver 2, and the data lines S1 to Sm are all connected to the data driver 3.

Multiple subpixels Lij (red (R) subpixels or green (G) subpixels or blue (B) subpixels or white (W) subpixel) are disposed in regions limited by the scanning lines Gi and Gi+1 (wherein, i is a natural number in a range from 1 to n) and the data lines Sj and Sj+1 (where, j is a natural number in a range from 1 to m). Wherein, a red (R) subpixel, a green (G) subpixel, a blue (B) subpixel and a white (W) subpixel form one pixel.

Thin film transistors (TFT) Qij are disposed near intersection locations of the scanning lines Gi and the data lines Sj.

Furthermore, the scanning line Gi is connected with a gate electrode of the thin film transistor (TFT) Qij; the data line Sj is connected with a source electrode of the thin film transistor (TFT) Qij; a pixel electrode of the subpixel Lij (red (R) subpixel or green (G) subpixel or blue (B) subpixel or white (W) subpixel) is connected with a drain electrode of the thin film transistors (TFT) Qij. A common electrode disposed oppositely to the pixel electrode of the subpixel Lij is connected to a common voltage circuit (not shown).

The scanning driver 2 and the data driver 3 are arranged around the display panel 1. The conversion system 4 for converting RGB data to RGBW data converts inputted RGB values to outputted RGBW values, and providing the outputted RGBW values to the data driver 3. In this embodiment, the inputted RGB values can be provided by an external host computer or graphics controller (not shown).

The data driver 3 receives and processes the outputted RGBW values provided from the conversion system 4 for converting RGB data to RGBW data so as to generate an analog signal and provide to the data lines S1 to Sm. The scanning driver 2 sequentially provides multiple scanning signals to the scanning lines G1 to Gn. The display panel 1 display an image through the analog data signal provided from the data driver and the scanning signals provided from the scanning driver 2.

The following will describe the conversion system 4 for converting RGB data to RGBW data in detail.

Figure 3:
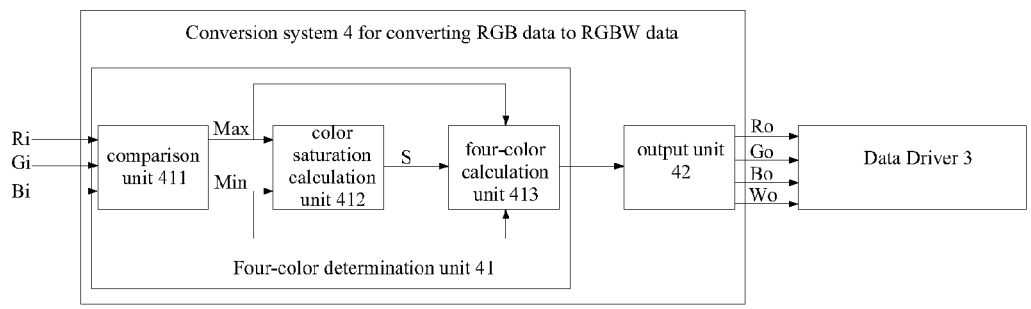
FIG. 3 is a schematic block diagram of a conversion system for converting RGB data to RGBW data according to an embodiment of the present invention.

FIG. 3 is a schematic block diagram of a conversion system for converting RGB data to RGBW data according to an embodiment of the present invention.

With reference to FIG. 3, the conversion system 4 for converting RGB data to RGBW data of the present invention comprises a four-color determination unit 41 and an output unit 42. According to another embodiment of the present invention, the conversion system 4 may comprise other different units. Similarly, the functions of the above units may be combined into a single component.

The four-color determination unit 41 determines the outputted RGBW values according to the inputted RGB values and a color saturation value of the inputted RGB values. When a minimum value of the inputted RGB values is increased and the color saturation value calculated from the inputted RGB values is decreased, an outputted W value is increased. The internal arrangement of the four-color determination unit 41 of the present invention is shown in FIG. 3. With reference to FIG. 3, the four-color determination unit 41 includes a comparison unit 411, a color saturation calculation unit 412 and a four-color calculation unit 413.

The comparison unit 411 receives the inputted RGB values, and based on the inputted RGB values, the comparison unit 411 determines a maximum value and a minimum value. The maximum value represents a maximum value of the inputted RGB values, and is expressed as Max (Ri, Gi, Bi). The minimum value represents a minimum value of the inputted RGB values, and is expressed as Min (Ri, Gi, Bi). Ri represents an inputted R value, Gi represents an inputted G value, and Bi represents an inputted B value. In the present embodiment, the inputted R value represents an input value of red color, the inputted G value represents an input value of green color, and the inputted B value represents an input value of blue color.

The color saturation calculation unit 412 calculates the color saturation according to the maximum value of the inputted RGB values (i.e. Max (Ri, Gi, Bi)) and the minimum value of the inputted RGB values (i.e. Min (Ri, Gi, Bi)). The color saturation value can be expressed as S. Besides, the color saturation calculation unit 412 can calculate the color saturation value S using the Max (Ri, Gi, Bi) and the Min (Ri, Gi, Bi) based on a Formula 1.

$$S=[(\text{Max}(Ri,Gi,Bi)-\text{Min}(Ri,Gi,Bi)]/\text{Max}(Ri,Gi,Bi) \quad \text{[Formula 1]}$$

The four-color calculation unit 413 calculates the outputted RGBW values according to the maximum value (Max (Ri, Gi, Bi)), the minimum value (Min (Ri, Gi, Bi)) and the color saturation value S. The four-color calculation unit 413 can calculate the outputted RGBW values using the maximum value (Max (Ri, Gi, Bi)), the minimum value (Min (Ri, Gi, Bi)) and the color saturation value S according to a Formula 2.

$$Ro=[(\text{Max}(Ri,Gi,Bi)+Wo)/\text{Max}(Ri,Gi,Bi)]\times Ri-Wo;$$

$$Go=[(\text{Max}(Ri,Gi,Bi)+Wo)/\text{Max}(Ri,Gi,Bi)]\times Gi-Wo;$$

$$Ro=[(\text{Max}(Ri,Gi,Bi)+Wo)/\text{Max}(Ri,Gi,Bi)]\times Bi-Wo; \text{ and}$$

$$Wo=\text{Min}(Ri,Gi,Bi)\times(1-S); \quad \text{[Formula 2]}$$

Wherein, Ro represents the outputted R value, Go represents the outputted G value, Bo represent the outputted B value, and Wo represents the outputted W value. In this embodiment, the outputted R value represent an output value of red color, the outputted G value represent an output value of green color, the outputted B value represent an output value of blue color, and the outputted W value represent an output value of white color.

The output unit 42 outputs the outputted RGBW values. The following will use the conversion system 4 to illustrate a conversion method for converting RGB data to RGBW data.

Figure 4:
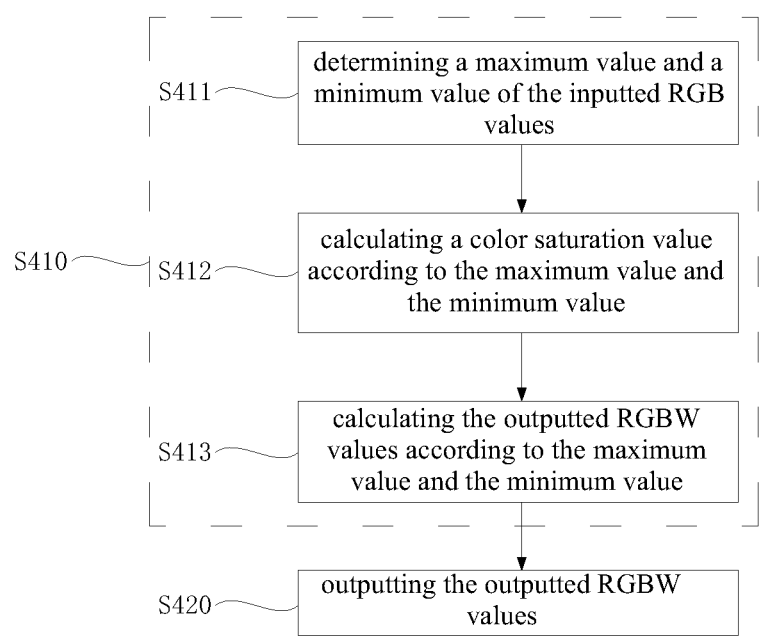
FIG. 4 is a flowchart of a conversion method for converting RGB data to RGBW data according to an embodiment of the present invention.

FIG. 4 is a flowchart of a conversion method for converting RGB data to RGBW data according to an embodiment of the present invention.

With reference to FIG. 4, in the step S410, the conversion system 4 determines outputted RGBW values according to inputted RGB values and a color saturation value calculated from the inputted RGB values. When a minimum value of the inputted RGB values is increased and the color saturation value calculated from the inputted RGB values is decreased, an outputted W value is increased. Through the step S411 to step S413 in FIG. 4, the outputted RGBW values are determined.

In step S411, the conversion system receives inputted RGB values, and determines a maximum value of the inputted RGB values and a minimum value of the inputted RGB values according to the inputted RGB values. The maximum value of the inputted RGB values is expressed as Max (Ri,Gi,Bi) and the minimum value of the inputted RGB values is expressed as Min (Ri,Gi,Bi). Ri represents an inputted R value, Gi represents an inputted G value, and Bi represents an inputted B value.

In step S412, the conversion system calculates a color saturation value according to the maximum value of the inputted RGB values (i.e. Max (Ri, Gi, Bi)) and the minimum value of the inputted RGB values (i.e. Min (Ri, Gi, Bi)). The color saturation value can be expressed as S. The color saturation value S is calculated using the Max (Ri, Gi, Bi) and the Min (Ri,Gi,Bi) according to the above Formula 1.

In the step S413, the conversion system calculates the outputted RGBW values according to the Max (Ri, Gi, Bi), the Min (Ri, Gi, Bi), and the color saturation value. According to the above Formula 2, using the Max (Ri, Gi, Bi), the Min (Ri, Gi, Bi), and the color saturation value to calculate the outputted RGBW values.

In the step S420, outputting the outputted RGBW values by the conversion system.

In summary, the conversion system and method for converting RGB data to RGBW data of the present invention can appropriately decrease the outputted W value and appropriately increase the outputted RGB values at the same time. Comparing to the conversion system of the display device of the conventional technology based on four-color subpixels, the brightness of the display device of the present invention can be maintained in the same degree, and increase the color saturation of the display device of the present invention.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A conversion system for converting Red-Green-Blue (RGB) data to Red-Green-Blue-White (RGBW) data, comprising:
    a four-color determination unit configured to determine outputted RGBW values according to inputted RGB values and a color saturation value calculated from the inputted RGB values; and
    an output unit configured to output the outputted RGBW values;

wherein, the four-color determination unit comprises:
    a comparison unit configured to determine a maximum value and a minimum value of the inputted RGB values;
    a color saturation calculation unit configured to calculate a color saturation value according to the inputted RGB values; and
    a four-color calculation unit configured to calculate the outputted RGBW values according to the maximum value of the inputted RGB values, the minimum value of the inputted RGB values, and the color saturation value; and wherein, the four-color calculation unit is further configured to use a Formula 2 to calculate the outputted RGBW values, $$Ro=[(\text{Max}(Ri,Gi,Bi)+Wo)/\text{Max}(Ri,Gi,Bi)]\times Ri-Wo;$$

$$Go=[(\text{Max}(Ri,Gi,Bi)+Wo)/\text{Max}(Ri,Gi,Bi)]\times Gi-Wo;$$

$$Ro=[(\text{Max}(Ri,Gi,Bi)+Wo)/\text{Max}(Ri,Gi,Bi)]\times Bi-Wo; \text{ and}$$

$$Wo=\text{Min}(Ri,Gi,Bi)\times(1-S); \quad \text{[Formula 2]}$$

wherein, Ri represents the inputted R value, Gi represents the inputted G value, Bi represents the inputted B value, Ro represents the outputted R value, Go represents the outputted G value, Bo represents the outputted B value, Wo represents the outputted W value, S represents the color saturation value, Max (Ri,Gi,Bi) represents the maximum value of the inputted RGB values, Min(Ri,Gi,Bi) represents the minimum value of the inputted RGB values.

2. The conversion system according to claim 1, wherein, when a minimum value of the inputted RGB values is increased and a color saturation value calculated from the inputted RGB values is decreased, an outputted W value is increased.

* * * * *